Nov. 12, 1957   J. W. HUTCHINS   2,813,010
GAS ANALYSIS

Filed Dec. 2, 1953   4 Sheets-Sheet 1

INVENTOR.
J. W. HUTCHINS
BY Hudson & Young
ATTORNEYS

Nov. 12, 1957

J. W. HUTCHINS 2,813,010

GAS ANALYSIS

Filed Dec. 2, 1953

INVENTOR.
J. W. HUTCHINS
BY Hudson & Young
ATTORNEYS

Nov. 12, 1957

J. W. HUTCHINS 2,813,010

GAS ANALYSIS

Filed Dec. 2, 1953

INVENTOR.
J. W. HUTCHINS

BY *Hudson & Young*

ATTORNEYS

United States Patent Office 2,813,010
Patented Nov. 12, 1957

2,813,010

GAS ANALYSIS

Joseph W. Hutchins, Bartlesville, Okla., assignor to Phillips Petroleum Company, a corporation of Delaware Application December 2, 1953, Serial No. 395,642

9 Claims. (Cl. 23—232)

This invention relates to a method of and apparatus for analyzing gaseous mixtures. In one specific aspect it relates to a method of analyzing a stream of natural gas to determine the amounts of the hydrocarbon constituents thereof.

In order to utilize natural gas in as efficient manner as possible it is important to determined the general composition of gas from a given field. A rich gas which contains a relatively high percentage of the heavier hydrocarbons can be condensed in part to form natural gasoline, whereas a lean gas containing predominantly methane generally is valuable primarily as a fuel. Thus by analyzing a gas sample to determine the relative abundance of the several hydrocarbon constituents thereof, it is possible to determine the best use for which the gas can be employed with regard to economic considerations. Furthermore, in the petroleum industry it is valuable to analyze residue streams from various hydrocarbon cracking operations to determine the constituents thereof.

In accordance with one aspect of the present invention there is provided an improved method of analyzing gas streams which is based upon the selective adsorption properties of certain materials. It is known that silica gel, activated charcoal and other adsorbents exhibit selective adsorption properties with regard to hydrocarbons of different atomic weights. The heavier molecules are selectively adsorbed over the lighter molecules. Thus if a stream of gas to be analyzed is passed continuously through a zone containing an adsorption material, the entire stream is first adsorbed until the adsorbent becomes saturated. At this point the lightest hydrocarbon present in the gas stream is replaced by the heavier constituents so that the light constituent appears as an effluent gas stream. At a later time the next heavier hydrocarbon is replaced, and this process continues until the adsorbent finally becomes saturated with the heaviest constituent in the stream being analyzed. By analyzing continuously the effluent stream from the adsorbent it is possible to determine the concentration of the various constituents present in the initial stream being adsorbed. If a sample of natural gas under analysis is a lean gas, considerable time is required for the adsorbent to become saturated with progressively heavier hydrocarbons. Thus an analysis procedure of this type is often time consuming for lean samples; and, furthermore, the sample being analyzed may not be of sufficient quantity to saturate the adsorbent with the heavier constituents.

These difficulties are overcome in accordance with the present invention by withdrawing, either continuously or periodically, a portion of the adsorbent material from the zone through which the gas stream is passed. By removing the adsorbent during the process of the analysis considerably less time and gas are needed to saturate the remaining adsorbent with the heavier hydrocarbons which are present in smaller quantities than are the lighter hydrocarbons. Novel apparatus is provided in accordance with this invention to effect this removal of the adsorbent either by removing a portion of the adsorbent from the adsorption zone or by directing the gas sample through progressively smaller portions of the adsorbent.

Accordingly, it is an object of this invention to provide an improved method of analyzing a gas sample to determine the constituents thereof.

Another object is to provide apparatus for analyzing gas samples in a rapid manner with a minimum loss of the sample.

Various other objects, advantages and features of this invention should become apparent from the following detailed description taken in conjunction with the accompanying drawing in which.

Figure 1:
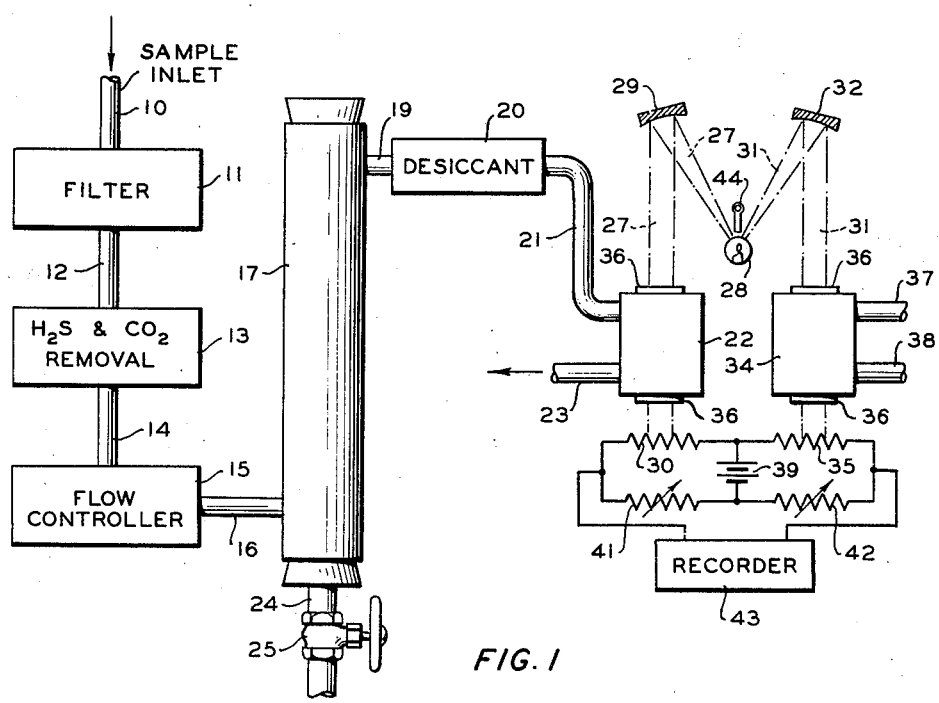
Figure 1 is a schematic representation of a first embodiment of the analysis apparatus of this invention.

Referring now to the drawing in detail and to Figure 1 in particular, there is shown a gas sample inlet line 10 having a fritted disk filter 11 therein. From filter 11 the gas sample is passed through a line 12 to a vessel 13 which contains a material for absorbing carbon dioxide and hydrogen sulfide from the gas sample. A suitable material for this purpose is a sodium hydroxide asbestos preparation which is known in the art as Ascarite. From vessel 13 the gas sample passes through a line 14, a flow controller 15 and then through a line 16 to the lower end of a tube 17 which is filled with a suitable selective adsorbent material such as silica gel or activated charcoal. The gas sample passes upwardly through tube 17 and outwardly therefrom through a line 19 to a desiccating vessel 20 which can be filled with calcium sulfate or calcium chloride, for example. If silica gel is employed as the adsorbent in tube 17, vessel 20 can be eliminated because the silica gel removes moisture from the sample. From vessel 20 the effluent gas stream passes through a line 21 to a sample cell 22, and thence is vented through an outlet line 23. A conduit 24 having a valve 25 therein is positioned within tube 17 such that a portion of the adsorbent material can be removed from tube 17 by opening valve 25 and lowering conduit 24 through tube 17 in a manner described in detail hereinafter.

A first beam of infrared radiation 27 is directed from a radiation source 28 by a reflector 29 through sample cell 22 to impinge upon a first temperature sensitive resistance element (thermistor) 30. A second beam of radiation 31 is directed from source 28 by a reflector 32 through a second sample cell 34 to impinge upon a second thermistor 35. Cells 22 and 34 are provided with radiation transparent windows 36 which can be formed of quartz, for example. Cell 34 is provided with an inlet 37 and an outlet 38 such that this cell can be filled with a sample of reference material having constant infrared absorption properties. In this manner the radiation absorption properties of the gas sample passed through cell 22 are compared directly with the radiation absorption properties of the reference material in cell 34. The resulting beams of radiation impinge upon respective thermistors 30 and 35 and cause resistance changes therein which are proportional to the total radiation incident thereon. First terminals of thermistors 30 and 35 are connected to one another and to a first terminal of a voltage source 39. The second terminal of thermistor 30 is connected to a balancing resistor 41, and the second terminal of thermistor 35 is connected to the first terminal of a second balancing resistor 42. The second terminals of resistors 41 and 42 are connected to one another and to the second terminal of voltage source 39. The junction between thermistor 30 and resistor 41 is connected to the first terminal of a recorder 43, and the junction between thermistor 35 and resistor 42 is connected to the second terminal of recorder 43.

Thermistors 30 and 35 and resistors 41 and 42 thus form a Wheatstone bridge circuit, and recorder 43 measures any electrical unbalance of the bridge circuit due to changes in radiation impinging upon thermistors 30 and 35. Initial balance of the bridge circuit can be obtained by means of a trimmer 44 which can be rotated selectively into either of the radiation beams emitted from source 28 to reduce the total intensity thereof. While this measuring circuit has been illustrated as a sample Wheatstone bridge circuit, it should be apparent that other measuring circuits can be employed in this manner if desired. For example, the analyzer shown in U. S. Patent 2,579,825 can be employed if it is desired to standardize the bridge circuit periodically. Any electrical unbalance of the bridge circuit results in a signal being applied to recorder 43 which is representative of the infrared radiation absorbed by the sample material passing through cell 22. A typical chart produced by recorder 43 is illustrated in Figure 2 wherein the readings of the chart are plotted against time.

The operation of the apparatus thus far described can be explained in conjunction with the analysis of a stream of natural gas containing nitrogen, carbon dioxide, hydrogen sulfide, hydrogen, methane, ethane, propane, butane and heavier hydrocarbons. The hydrogen sulfide and carbon dioxide are removed by vessel 13 because the former is likely to cause corrosion of the apparatus and the latter produces a strong absorption band in the infrared region. The desiccating material in vessel 20 removes water vapor from the effluent gas from the adsorption zone because such vapor also has an absorption band in the infrared region.

Figure 2:
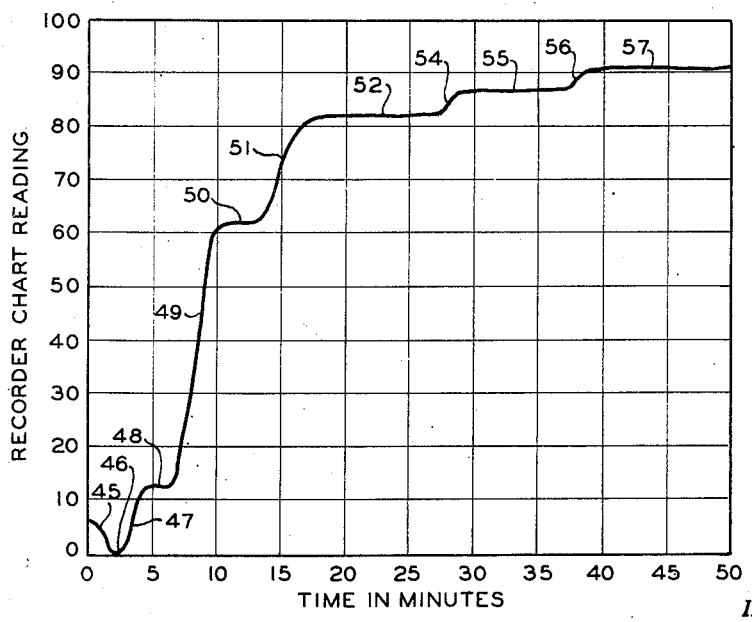
Figure 2 represents a typical recorder curve produced by the apparatus of Figure 1.

As flow of the natural gas stream through tube 17 is begun, there is an initial period during which the cell is being purged with dry air, this period being indicated by portion 45 of the curve of Figure 2. This short period 46 indicates when the cell is filled with dry air, and represents zero infrared absorption. Following a short period 46 during which the adsorbent becomes saturated with hydrogen and nitrogen, some methane begins to appear in the effluent from the adsorption zone. The remaining hydrocarbon constituents are completely absorbed at this time. The appearance of methane in the effluent stream produces an increase in the infrared adsorption which is indicated by the rising portion 47 of the recorded curve. This curve soon levels out to form a plateau 48. During this latter period the adsorbent is becoming saturated with ethane so that the effluent contains substantially all the methane and inerts present in the feed, together with an additional small quantity of methane which is desorbed by the ethane and heavier hydrocarbons. When the adsorbent becomes saturated with ethane, this material appears in the effluent and produces a further increase in the infrared adsorption characteristics as indicated by the rising portion 49 of the recorded curve. This rising portion 49 merges into a second plateau 50 at the time the adsorbent becomes saturated with propane. At this latter time the effluent gas contains all the methane, ethane and inerts in the feed stream, together with a small portion of these materials which are desorbed by the propane and heavier hydrocarbons. In similar fashion the sloping portion 51 and plateau 52 of the curve indicate the presence of propane in the effluent. When the adsorbent becomes saturated with butane a further sloping portion 54 and a corresponding plateau 55 are recorded. The sloping portion 56 and plateau 57 of the curve indicate the time at which the adsorbent becomes saturated with pentane and heavier hydrocarbons present in the stream under analysis. While it is possible that this curve can be extended to still heavier hydrocarbons, these constituents generally are present in extremely small quantities and for all practical purposes the analysis is complete with pentane. At this time the adsorbent may be by-passed, and a step recorded that represents the hexane and heavier constituents in the gas sample.

From an inspection of the curve of Figure 2 it can be seen that considerable time (and resulting gas sample) is lost during the periods represented by the several plateaus. To overcome this difficulty, valve 25 is opened and conduit 24 is lowered slightly in tube 17 at the beginning of plateau 50. Conduit 24 is lowered such that a small percentage of the adsorbent in tube 17 is allowed to pass out of tube 17 through conduit 24. By reducing the quantity of adsorbent through which the gas sample is passed, less time and less sample are required to saturate the remaining adsorbent with the ethane and heavier hydrocarbon constituents. Thus the time represented by plateau 50 is shortened considerably. When plateau 52 is recorded, conduit 24 is lowered again to remove an additional quantity of adsorbent from tube 17. This functions to shorten the period of plateau 52. In similar manner, conduit 24 is once again lowered at the beginning of plateau 55, and the process can be repeated for the heavier hydrocarbon constituents, if desired.

The quantity of adsorbent removed during any step of an analysis is primarily a function of the general composition of the gas stream being analyzed. If the gas stream represents a rich gas containing a relatively large percentage of heavier hydrocarbon constituents, then very little of the adsorbent is removed during the initial portion of the analysis; and correspondingly increased amounts are removed during the later steps. If the gas sample represents a lean gas containing a relatively large percentage of light constituents, then a considerable quantity of the adsorbent is removed during the initial steps. The levels of plateaus 48, 50, 52, 55 and 57 in Figure 2 are representative of the percentages of the various constituents present in the sample under analysis. The level of plateau 48 gives the percentages of methane and non-hydrocarbons present in the sample passed through the adsorbent tube. Knowing the percentage of methane, the percentages of each heavier hydrocarbon can readily be calculated from a previous calibration of the instrument for mixtures of known composition.

Figure 3:
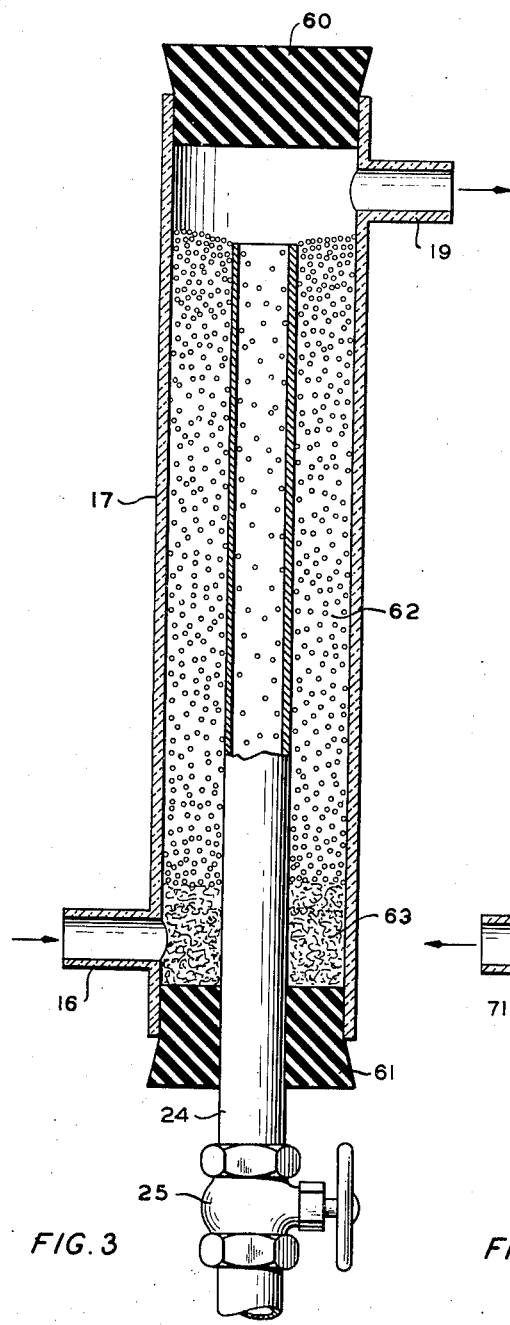
Figure 3 is a detailed view of a first embodiment of the variable volume adsorption zone provided by this invention.

In Figure 3, adsorbent tube 17 is illustrated in greater detail. This tube can be constructed of glass or any other suitable material. Inlet line 16 communicates near the lower end of tube 17 and outlet 19 communicates with the upper end of tube 17. The upper and lower ends of tube 17 receive stoppers 60 and 61 which enable the tube to be filled with the adsorbent. Stopper 61 is provided with a central opening through which is inserted conduit 24. A quantity of glass wool 63 is positioned in the bottom of tube 17 to prevent the adsorbent from passing out through inlet 16. This adsorbent preferably is in the form of silica gel pellets 62 which readily fall out through conduit 24 when this conduit is lowered through tube 17. The upper end of conduit 24 extends nearly to the top of tube 17 in its initial position.

Figure 4:
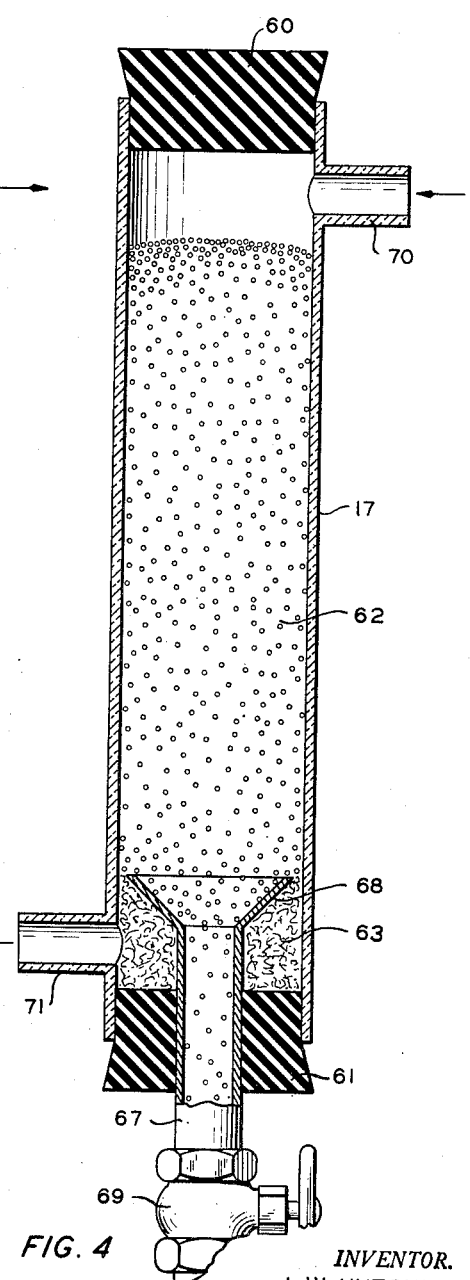
Figure 4 is a second embodiment of a variable volume adsorption zone.

In Figure 4 there is illustrated a modified form of adsorption tube 17. In this tube conduit 24 is replaced by a conduit 67 that is rigidly positioned within tube 17, and which is provided with a generally funnel-shaped upper end 68. Conduit 67 is provided with a valve 69 which can be opened to allow adsorbent 62 to pass outwardly from tube 17 through conduit 67. A quantity of glass wool 63 is positioned in the bottom of tube 17 to prevent the adsorbent from being removed through opening 71. In this particular embodiment of the adsorption tube, the gas sample is passed in through an opening 70 and out through opening 71 so as to move downwardly through the adsorbent 62. In this manner the adsorbent is removed directly at the outlet end of the tube through conduit 67. This assembly eliminates the necessity of moving conduit 67 within plug 61. The mere opening of valve 69 is sufficient to remove a portion of the adsorbent.

Figure 5:
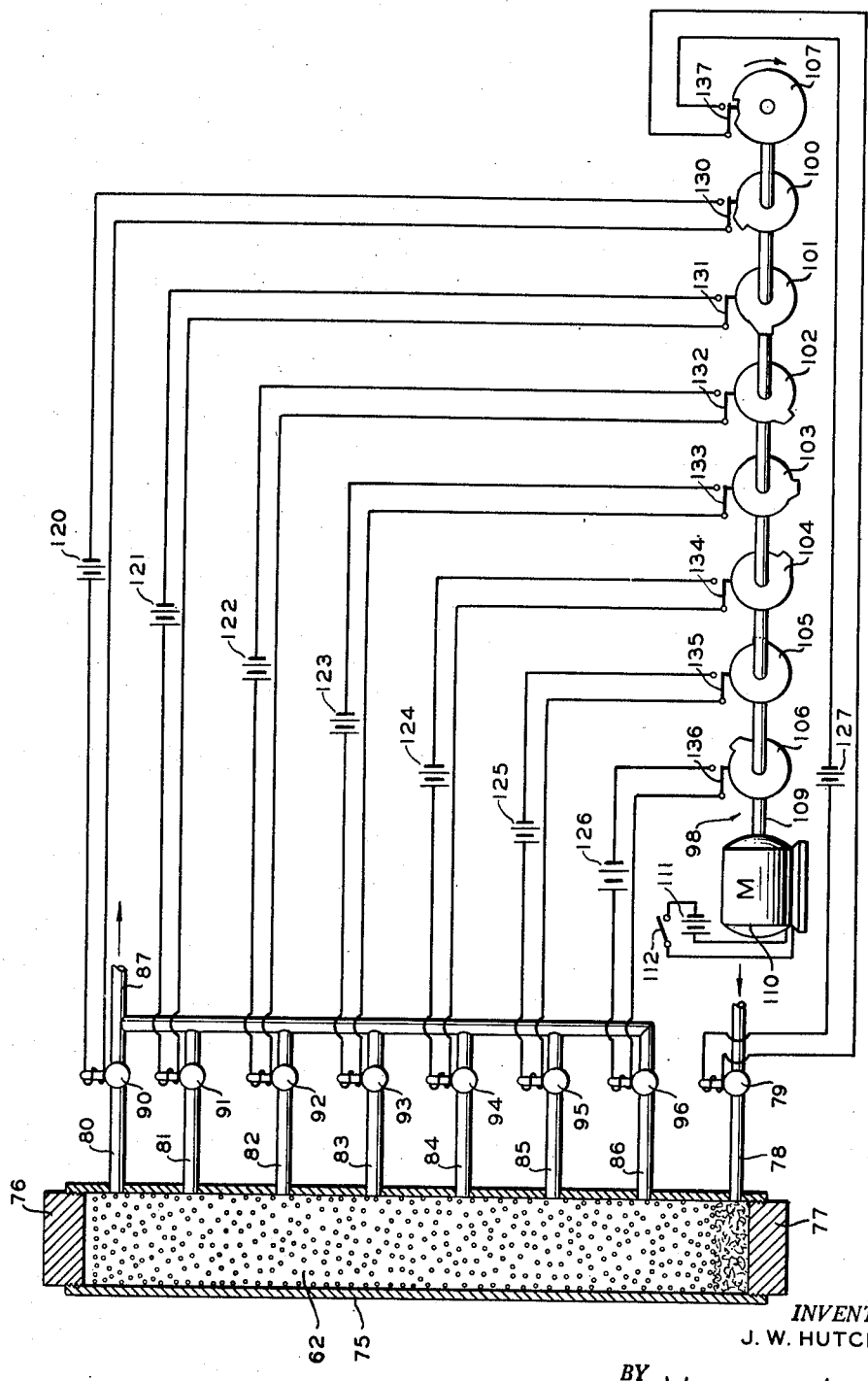
Figure 5 is a schematic representation of a system employing a plurality of conduits whereby the gas stream is passed through variable portions of the adsorption zone.

In Figure 5 there is shown an adsorbent tube assembly wherein the total quantity of adsorbent contained within a tube 75 remains constant but the effective length of the adsorption column is varied by a plurality of valved conduits. Tube 75 is provided with upper and lower plugs 76 and 77 which can be threaded into tube 75. A quantity of adsorbent 62 substantially fills the interior of tube 75. The gas stream under analysis is passed into the lower portion of tube 75 through an inlet conduit 78 having a solenoid operated valve 79 disposed therein. A plurality of outlet conduits 80, 81, 82, 83, 84, 85 and 86 having respective solenoid operated valves 90, 91, 92, 93, 94, 95 and 96 therein communicate at respective first ends with the interior of tube 75. Conduit 80 is in communication with the top of tube 75, and the remaining conduits communicate with successively lower regions in tube 75. The respective second ends of each of the outlet conduits 80—86 communicate with a common outlet conduit 87. Solenoid operated valves 79 and 90—96 are operated by a motor driven switch assembly 98. This switch assembly includes a plurality of cams 100, 101, 102, 103, 104, 105, 106, and 107, which are mounted on a common drive shaft 109 which is rotated by a motor 110 through suitable gearing, not shown. Motor 110 is energized from a voltage source 111 which is applied thereto to a switch 112. The solenoids of valves 90, 91, 92, 93, 94, 95, 96 and 79 are energized by respective voltage sources 120, 121, 122, 123, 124, 125, 126 and 127 which are connected in circuit therewith through respective switches 130, 131, 132, 133, 134, 135, 136 and 137. Switches 130—137 are closed by rotation of respective cams 100—107 to predetermined positions.

Closure of switch 112 energizes motor 110 to start rotation of shaft 109 of switch assembly 98. Cam 107 first closes switches 137 to energize solenoid valve 79 to allow the sample stream under analysis to pass into tube 75. At this time cam 100 closes switch 130 to open valve 90 whereby the sample stream passes through the entire mass of adsorbent 62. At the end of a predetermined time cam 101 closes switch 131 to open valve 91 and cam 100 rotates to open switch 130. Thus the upper portion of the adsorbent is effectively by-passed because the gas sample is allowed to leave tube 75 through conduit 81. This has the same effect as removing a portion of the adsorbent from tube 75. In a similar fashion valves 92, 93, 94, 95 and 96 are opened in succession to by-pass additional quantities of the adsorbent.

Figure 6:
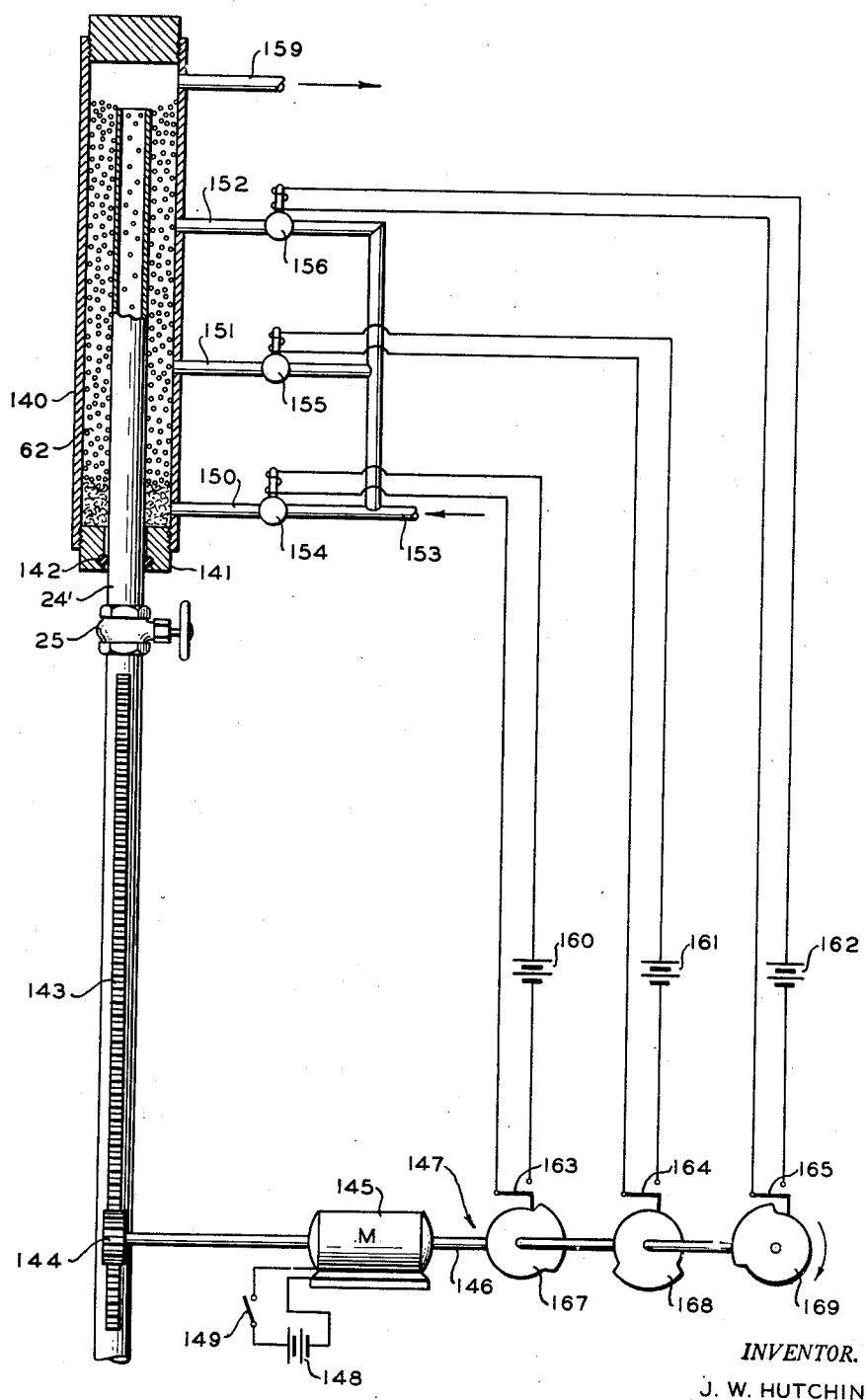
Figure 6 is a schematic representation of a variable volume adsorption zone, together with valved conduit means to enable the system to analyze a gas stream in a continuous manner.

In Figure 6 there is shown a modified form of the adsorbent tube wherein a tube 140 is filled with a mass of adsorbent 62. A conduit 24' having a valve 25 therein extends through a plug 141 in the bottom of tube 140 in a similar manner to conduit 24 in Figure 3. Plug 141 is provided with an annular sealing ring 142 to prevent the leakage of gas from the interior of tube 140. The lower portion of conduit 24' is provided with a rack 143, and a pinion 144 is in engagement with rack 143. Pinion 144 is rotated by a motor 145 which also rotates the drive shaft 146 of a switch assembly 147 through suitable gearing, not shown. Motor 145 is energized by a source of current 148 which is applied thereto to a switch 149. A plurality of sample stream inlet conduits 150, 151 and 152 communicate with the interior of tube 140 at spaced regions therein. A common inlet line 153 communicates with each of conduits 150, 151 and 152 through respective solenoid operated valves 154, 155 and 156. An outlet conduit 159 communicates with the top of tube 140. The solenoids of valves 154, 155 and 156 are energized by respective voltage sources 160, 161 and 162 through respective switches 163, 164 and 165. Switches 163, 164 and 165 are in turn closed by respective cams 167, 168 and 169 which are mounted on shaft 146 of switch assembly 147. Closure of switch 149 energizes motor 145 to rotate cam 169 to close switch 165. This opens valves 156 to allow the passage of the sample stream into tube 140 through conduit 152. The sample then passes upwardly through adsorbent 62 and leaves tube 140 through conduit 159. At the same time, motor 145 slowly rotates pinion 144 to move conduit 24' downwardly through tube 140. This results in a portion of the adsorbent being removed continuously from tube 140. This operation is effectively the same as the manual operation of the assembly of Figure 3 except that the adsorbent is removed in a continuous manner rather than intermittently.

The cams on timing switch 147 are positioned such that cam 168 closes switch 164 after the period of time required for a complete analysis of the gas sample originally passed through conduit 152. At this time conduit 24' has been lowered such that the top thereof is adjacent conduit 152. By opening valve 155 the sample stream enters tube 140 through conduit 151 and passes upwardly through a fresh portion of adsorbent 62. In this manner the gas analysis is repeated in its entirety. Following this second analysis, cam 167 is rotated to close switch 165 to open valve 154. A third gas sample is then passed upwardly through tube 140 from conduit 150 and a third complete analysis is performed. This arrangement of Figure 6 thus provides both an automatic decrease in the volume of adsorbent in tube 140 and a series of automatic analyses of a continuous gas sample. Obviously the principle of lowering conduit 24' in an automatic manner by rotation of motor 145 can be incorporated in the analysis system either with or without the valved conduit assembly which is actuated by switch 147.

In some instances it may be desired to calibrate the analysis in terms of hydrogen sulfide, carbon dioxide and water vapor which may be present in the gas stream being analyzed. This can be done either before or after the analysis. The adsorbent is removed from tube 17 and replaced by a dessicant which removes only water vapor; anhydrous calcium sulfate or calcium chloride can be employed, for example. Filters 13 and 20 are removed at this time and the decrease in infrared absorption is noted with the water vapor removed. Tube 17 then is filled with a material which removes only hydrogen sulfide; dry copper sulfate can be employed, for example. This indicates in infrared absorption due to the presence of hydrogen sulfide. By placing filter 13 in the stream, the total absorption by water vapor, carbon dioxide and hydrogen sulfide can be observed. From these three observations, the absorption due to carbon dioxide is obtained.

While this invention has been described in conjunction with the analysis of a natural gas stream to determine the hydrocarbon constituents thereof, it should be apparent that the principles of the invention are applicable to the analysis of any gas stream wherein the constituents are selectively adsorbed by an adsorbent material. Furthermore, ultraviolet or even visible light radiation can be substituted for the infrared radiation in certain applications. The use of ultraviolet radiation is particularly advantageous in situations where there is a considerable variation between the absorption characteristics of saturated and unsaturated materials. Therefore, a stream containing both saturated and unsaturated hydrocarbons can be analyzed advantageously by the use of ultraviolet radiations.

While this invention has been described with present preferred embodiments thereof, it is to be understood that the invention is not limited thereto.

What is claimed is:

1. The method of analyzing a mixture of gases which are adsorbed by a given adsorbent to varying degrees which comprises passing a mixture of such gases to be analyzed through a zone containing such an adsorbent whereby the constituents of said mixture are selectively adsorbed so that these constituents appear in succession in the effluent stream from said zone in the reverse order of their adsorbability, the least adsorbable constituent appearing first, directing a beam of radiation through the effluent stream from said zone, measuring the intensity of said radiation beam after its passage through said effluent stream, and decreasing the quantity of adsorbent material through which said mixture is passed while said mixture is being passed through said zone and after the adsorbent is saturated with respect to at least one constituent of the mixture.

2. The method of analyzing a mixture of hydrocarbon gases which comprises passing a mixture of hydrocarbon gases to be analyzed through a zone containing an adsorption material whereby the constituents of said mixture are selectively adsorbed so that these constituents appear in succession in the effluent stream from said zone in the order of increasing number of carbon atoms per molecule, measuring the composition of the effluent stream from said zone, and continuously withdrawing the adsorption material from said zone while said mixture is being passed through said zone and after the adsorption material is saturated with respect to at least one constituent of the mixture.

3. The method of analyzing a mixture of hydrocarbon gases which comprises passing a mixture of hydrocarbon gases to be analyzed through a zone containing an adsorption material whereby the constituents of said mixture are selectively adsorbed so that these constituents appear in succession in the effluent stream from said zone in the order of increasing number of carbon atoms per molecule, directing a beam of radiation through the effluent stream from said zone, measuring the intensity of said radiation beam after its passage through said effluent stream, and withdrawing a portion of the adsorbent from said zone during the process of the analysis when the intensity of the measured radiation becomes constant with respect to time.

4. The method of analyzing a mixture of hydrocarbon gases which comprises passing a mixture of hydrocarbon gases to be analyzed through a zone containing an adsorption material wherein the constituents of said mixture are selectively adsorbed so that the constituents of said mixture appear in succession in the effluent stream from said zone in the order of increasing number of carbon atoms per molecule, directing a first beam of radiation through the effluent stream from said zone, directing a second beam of radiation through a material of selected composition, comparing the resulting intensities of said first and second beams of radiation, and decreasing the quantity of adsorption material through which said mixture is directed while said mixture is being passed through said zone and after the adsorption material is saturated with respect to at least one constituent of the mixture.

5. The method of analyzing a stream of natural gas which comprises passing a stream of natural gas to be analyzed through filter means to remove any hydrogen sulfide and carbon dioxide which may be present in said mixture, passing said mixture through a zone containing silica gel wherein the hydrocarbon constituents of said stream are selectively adsorbed, whereby the hydrocarbon constituents of said stream appear in succession in the effluent stream from said zone in the order of increasing number of carbon atoms per molecule, directing a beam of infrared radiation through the effluent stream from said zone, measuring the intensity of said infrared radiation beam after its passage through said effluent stream, and withdrawing a portion of the silica gel from said zone at times when the measured radiation remains constant with respect to time.

6. Apparatus for analyzing a gaseous mixture comprising, in combination, a first upright elongated conduit having inlet and outlet openings at opposite ends thereof for passage of a gas stream therethrough, a second upright conduit adjustably mounted within said first conduit, said second conduit being smaller than said first conduit, a quantity of gas adsorbing material disposed in the region between said first and second conduits, and means for withdrawing said second conduit from said first conduit so that said adsorbing material is removed from said first conduit through said second conduit.

7. Apparatus for analyzing a gaseous mixture comprising, in combination, an elongated conduit, a quantity of gas adsorbing material disposed in said conduit, an inlet conduit communicating with said elongated conduit adjacent one end thereof, a plurality of outlet conduits communicating with said elongated conduit at spaced positions with respect to said inlet conduit, a valve disposed in each of said outlet conduits, and switching means to open the valves in said outlet conduits sequentially so that the quantity of adsorbing material between said inlet conduit and the outlet conduit having an open valve therein is decreased progressively.

8. Apparatus for analyzing a gaseous mixture comprising, in combination, a first upright elongated conduit having an outlet opening at one end thereof, a plurality of inlet conduits communicating with said first conduit at spaced positions with respect to said outlet conduit, a valve disposed in each of said inlet conduits, a second upright conduit adjustably mounted within said first conduit, said second conduit being smaller than said first conduit, a quantity of gas adsorbing material disposed in the region between said first and second conduits, switching means to open the valves in said inlet conduits sequentially so that the quantity of adsorbing material between said outlet conduit and the inlet conduit having an open valve therein is increased progressively, and means for withdrawing said second conduit from said first conduit whereby said adsorbing material is removed from said first conduit through said second conduit.

9. The method of analyzing a mixture of gases which are adsorbed by a given adsorbent to varying degrees which comprises passing a mixture of such gases to be analyzed through a zone containing such an adsorbent whereby the constituents of said mixture are selectively adsorbed so that these constituents appear in succession in the effluent stream from said zone in the reverse order of their adsorbability, the least adsorbable constituent appearing first, measuring the composition of the effluent stream from said zone, and decreasing the quantity of adsorbent material through which said mixture is passed while said mixture is being passed through said zone and after the adsorbent is saturated with respect to at least one constituent of the mixture.

References Cited in the file of this patent

UNITED STATES PATENTS

| 1,965,461 | Gray | July 3, 1934 |
| 1,974,498 | Lewis | Sept. 25, 1934 |
| 2,345,219 | Sanderson | Mar. 28, 1944 |
| 2,382,381 | Calvert et al. | Aug. 14, 1945 |
| 2,395,489 | Major et al. | Feb. 26, 1946 |
| 2,533,296 | Stuart | Dec. 12, 1950 |
| 2,545,162 | Muly et al. | Mar. 31, 1951 |
| 2,570,064 | Meinert | Oct. 2, 1951 |
| 2,590,322 | Imhoff et al. | Mar. 25, 1952 |
| 2,694,923 | Carpenter | Nov. 23, 1954 |